(12) United States Patent
Kang

(10) Patent No.: US 7,539,346 B2
(45) Date of Patent: May 26, 2009

(54) H.264 DECODING METHOD FOR FAST CAVLC

(75) Inventor: Hae Yong Kang, Seoul (KR)

(73) Assignee: C&S Technology Co., Ltd., Seoul (KR)

( * ) Notice: Subject to any disclaimer, the term of this patent is extended or adjusted under 35 U.S.C. 154(b) by 655 days.

(21) Appl. No.: 11/301,227

(22) Filed: Dec. 12, 2005

(65) Prior Publication Data

US 2007/0036448 A1 Feb. 15, 2007

(30) Foreign Application Priority Data

Aug. 9, 2005 (KR) .................. 10-2005-0072817

(51) Int. Cl.
*G06K 9/36* (2006.01)
(52) U.S. Cl. .................. 382/233; 375/E7.027; 382/246
(58) Field of Classification Search .............. 382/232, 382/233, 246; 341/50, 107, 51, 106; 375/240.16, 375/240.23, E7.027, E7.144, E7.211
See application file for complete search history.

(56) References Cited

U.S. PATENT DOCUMENTS

| 5,883,823 | A  | * | 3/1999 | Ding | .................. 708/402 |
| 6,950,040 | B2 | * | 9/2005 | Tsuru | .................. 341/50 |
| 7,430,238 | B2 | * | 9/2008 | Lin et al. | .............. 375/240.16 |

* cited by examiner

*Primary Examiner*—Kanji Patel
(74) *Attorney, Agent, or Firm*—Volpe and Koenig P.C.

(57) ABSTRACT

There is provided a H.264 decoding method for fast CAVLC, which searches multiple tables effectively and fast to obtain coefficients for CAVLC blocks within the shortest period of time such that a decoder with excellent efficiency can be designed for low frequency. The H.264 decoding method for fast CAVLC includes: a first step of obtaining the number of '0's including the firstly inputted bit '0' to the bit '0' right before the bit '1' firstly appearing to obtain a row index value; a second step of obtaining a fix index indicating the first bit '1'; a third step of obtaining a column index indicating a bit stream other than the row index and fix index; and a fourth step of obtaining a total coefficient and trailing ones T1*s* corresponding to the row index value and the column index value.

10 Claims, 10 Drawing Sheets

| Total_coeff( ) | Trailing_ones( ) | | | |
| --- | --- | --- | --- | --- |
| | 0 | 1 | 2 | 3 |
| 0 | 1 | - | - | - |
| 1 | 000101 | 01 | - | - |
| 2 | 00000111 | 000100 | 001 | - |
| 3 | 000000111 | 00000110 | 0000101 | 00011 |
| 4 | 0000000111 | 000000110 | 00000101 | 000011 |
| 5 | 00000000111 | 0000000110 | 000000101 | 0000100 |
| 6 | 0000000001111 | 00000000110 | 0000000101 | 00000100 |
| 7 | 0000000001011 | 0000000001110 | 000000000101 | 000000100 |
| 8 | 0000000001000 | 0000000001010 | 0000000001101 | 0000000100 |
| 9 | 00000000001111 | 00000000001110 | 0000000001001 | 00000000100 |
| 10 | 00000000001011 | 00000000001010 | 00000000001101 | 0000000001100 |
| 11 | 000000000001111 | 000000000001110 | 00000000001001 | 00000000001100 |
| 12 | 000000000001011 | 000000000001010 | 000000000001101 | 00000000001000 |
| 13 | 0000000000001111 | 000000000000001 | 000000000001001 | 000000000001100 |
| 14 | 0000000000001011 | 0000000000001110 | 0000000000001101 | 000000000001000 |
| 15 | 0000000000000111 | 0000000000001010 | 0000000000001001 | 0000000000001100 |
| 16 | 0000000000000100 | 0000000000000110 | 0000000000000101 | 0000000000001000 |

FIG. 1

| Leading Zero | 0 | 1 | 2 | 3 | 4 | 5 | 6 | 7 |
|---|---|---|---|---|---|---|---|---|
| 0 | 1 | | | | | | | |
| 1 | 1 | | | | | | | |
| 2 | 1 | | | | | | | |
| 3 | 100 | 101 | 11 | | | | | |
| 4 | 100 | 101 | 11 | | | | | |
| 5 | 100 | 101 | 110 | 111 | | | | |
| 6 | 100 | 101 | 110 | 111 | | | | |
| 7 | 100 | 101 | 110 | 111 | | | | |
| 8 | 100 | 101 | 110 | 111 | | | | |
| 9 | 1000 | 1001 | 1010 | 1011 | 1100 | 1101 | 1110 | 1111 |
| 10 | 1000 | 1001 | 1010 | 1011 | 1100 | 1101 | 1110 | 1111 |
| 11 | 1000 | 1001 | 1010 | 1011 | 1100 | 1101 | 1110 | 1111 |
| 12 | 1000 | 1001 | 1010 | 1011 | 1100 | 1101 | 1110 | 1111 |
| 13 | 100 | 101 | 110 | 111 | | | | |
| 14 | 1 | | | | | | | |

FIG. 3

| Leading Zero | Column Index (Total_coeff( ), Trailing_ones( )) | | | | | | | |
|---|---|---|---|---|---|---|---|---|
| | 0 | 1 | 2 | 3 | 4 | 5 | 6 | 7 |
| 0 | 0,0 | | | | | | | |
| 1 | 1,1 | | | | | | | |
| 2 | 2,2 | | | | | | | |
| 3 | 2,1 | 1,0 | 3,3 | | | | | |
| 4 | 5,3 | 3,2 | 4,3 | | | | | |
| 5 | 6,3 | 4,2 | 3,1 | 2,0 | | | | |
| 6 | 7,3 | 5,2 | 4,1 | 3,0 | | | | |
| 7 | 8,3 | 6,2 | 5,1 | 4,0 | | | | |
| 8 | 9,3 | 7,2 | 6,1 | 5,0 | | | | |
| 9 | 8,0 | 9,2 | 8,1 | 7,0 | 10,3 | 8,2 | 7,1 | 6,0 |
| 10 | 12,3 | 11,2 | 10,1 | 10,0 | 11,3 | 10,2 | 9,1 | 9,0 |
| 11 | 14,3 | 13,2 | 12,1 | 12,0 | 13,3 | 12,2 | 11,1 | 11,0 |
| 12 | 16,3 | 15,2 | 15,1 | 14,0 | 15,3 | 14,2 | 14,1 | 13,0 |
| 13 | 16,0 | 16,2 | 16,1 | 15,0 | | | | |
| 14 | 13,1 | | | | | | | |

FIG. 5

| Total_coeff( ) | Trailing_ones( ) | | | |
| --- | --- | --- | --- | --- |
| | 0 | 1 | 2 | 3 |
| 0 | 11 | - | - | - |
| 1 | 001011 | 10 | - | - |
| 2 | 000111 | 00111 | 011 | - |
| 3 | 0000111 | 001010 | 001001 | 0101 |
| 4 | 00000111 | 000110 | 000101 | 0100 |
| 5 | 00000100 | 0000110 | 0000101 | 00110 |
| 6 | 000000111 | 00000110 | 00000101 | 001000 |
| 7 | 00000001111 | 000000110 | 000000101 | 000100 |
| 8 | 00000001011 | 00000001110 | 00000001101 | 0000100 |
| 9 | 000000001111 | 00000001010 | 00000001001 | 000000100 |
| 10 | 000000001011 | 000000001110 | 000000001101 | 00000001100 |
| 11 | 000000001000 | 000000001010 | 000000001001 | 00000001000 |
| 12 | 0000000001111 | 0000000001110 | 0000000001101 | 000000001100 |
| 13 | 0000000001011 | 0000000001010 | 0000000001001 | 0000000001100 |
| 14 | 0000000000111 | 00000000001011 | 0000000000110 | 0000000001000 |
| 15 | 00000000001001 | 00000000001000 | 00000000001010 | 0000000000001 |

FIG. 6

| Row Index | Column Index (Total_coeff( ), Trailing_ones( )) | | | | | | | |
|---|---|---|---|---|---|---|---|---|
| 0 | 1,1 | 0,0 | | | | | | |
| 1 | 4,3 | 3,3 | 2,2 | | | | | |
| 2 | 6,3 | 3,2 | 3,1 | 1,0 | 5,3 | 2,1 | | |
| 3 | 7,3 | 4,3 | 4,1 | 2,0 | | | | |
| 4 | 8,3 | 5,2 | 5,1 | 3,0 | | | | |
| 5 | 5,0 | 6,2 | 6,1 | 4,0 | | | | |
| 6 | 9,3 | 7,2 | 7,1 | 6,0 | | | | |
| 7 | 11,3 | 9,2 | 9,1 | 8,0 | 10,3 | 8,2 | 8,1 | 7,0 |
| 8 | 11,0 | 11,2 | 11,1 | 10,0 | 12,3 | 10,2 | 10,1 | 9,0 |
| 9 | 14,3 | 13,2 | 13,1 | 13,0 | 13,3 | 12,2 | 12,1 | 12,0 |
| 10 | 15,0 | 15,1 | 15,2 | 14,1 | 14,2 | 14,0 | | |
| 11 | 16,3 | 16,2 | 16,1 | 16,0 | | | | |
| 12 | 15,3 | | | | | | | |

FIG. 7

| Total_coeff( ) | Trailing_ones( ) | | | |
| --- | --- | --- | --- | --- |
| | 0 | 1 | 2 | 3 |
| 0 | 1111 | - | - | - |
| 1 | 001111 | 1110 | - | - |
| 2 | 001011 | 01111 | 1101 | - |
| 3 | 001000 | 01100 | 01110 | 1100 |
| 4 | 0001111 | 01010 | 01011 | 1011 |
| 5 | 0001011 | 01000 | 01001 | 1010 |
| 6 | 0001001 | 001110 | 001101 | 1001 |
| 7 | 0001000 | 001010 | 001001 | 1000 |
| 8 | 00001111 | 0001110 | 0001101 | 01101 |
| 9 | 00001011 | 00001110 | 0001010 | 001100 |
| 10 | 000001111 | 00001010 | 00001101 | 0001100 |
| 11 | 000001011 | 000001110 | 00001001 | 00001100 |
| 12 | 000001000 | 000001010 | 000001101 | 00001000 |
| 13 | 0000001101 | 000000111 | 000001001 | 000001100 |
| 14 | 0000001001 | 0000001100 | 0000001011 | 0000001010 |
| 15 | 0000000101 | 0000001000 | 0000000111 | 0000000110 |
| 16 | 0000000001 | 0000000100 | 0000000011 | 0000000010 |

FIG. 8

| Row Index | Column Index (Total_coeff( ), Trailing_ones( )) | | | | | | | |
|---|---|---|---|---|---|---|---|---|
| 0 | 7,3 | 6,3 | 5,3 | 4,3 | 3,3 | 2,2 | 1,1 | 0,0 |
| 1 | 5,1 | 5,2 | 4,1 | 4,2 | 3,1 | 8,3 | 3,2 | 2,1 |
| 2 | 3,0 | 7,2 | 7,1 | 2,0 | 9,3 | 6,2 | 6,1 | 1,0 |
| 3 | 7,0 | 6,0 | 9,2 | 5,0 | 10,3 | 8,2 | 8,1 | 4,0 |
| 4 | 12,3 | 11,2 | 10,1 | 9,0 | 11,3 | 10,2 | 9,1 | 8,0 |
| 5 | 12,0 | 13,2 | 12,1 | 11,0 | 13,3 | 12,2 | 11,1 | 10,0 |
| 6 | 15,1 | 14,0 | 14,3 | 14,2 | 14,1 | 13,0 | 13,1 | |
| 7 | 16,1 | 15,0 | 15,3 | 15,2 | | | | |
| 8 | 16,2 | 16,0 | | | | | | |
| 9 | 16,0 | | | | | | | |

FIG. 9

| Total_coeff( ) | Trailing_ones( ) | | | |
|---|---|---|---|---|
| | 0 | 1 | 2 | 3 |
| 0 | 01 | - | - | - |
| 1 | 000111 | 1 | - | - |
| 2 | 000100 | 000110 | 001 | - |
| 3 | 000011 | 0000011 | 0000010 | 000101 |
| 4 | 000010 | 00000011 | 00000010 | 0000000 |

FIG. 10

|   | Column Index (Total_coeff( ), Trailing_ones( )) | | | |
|---|---|---|---|---|
| 0 | 1,1 | | | |
| 1 | 0,0 | | | |
| 2 | 2,2 | | | |
| 3 | 2,0 | 3,3 | 2,1 | 1,0 |
| 4 | 4,0 | 3,0 | | |
| 5 | 3,2 | 3,1 | | |
| 6 | 4,2 | 4,1 | | |
| 7 | 4,3 | | | |

H.264 DECODING METHOD FOR FAST CAVLC

BACKGROUND OF THE INVENTION

1. Field of the Invention

The present invention relates to a H.264 decoding method for fast context adaptive variable length coding (CAVLC), and more particularly, to a method of finding multiple tables effectively and fast to obtain coefficients for CAVLC blocks within the shortest period of time such that a decoder with excellent efficiency can be designed for low frequency.

2. Background of the Related Art

In the age of ultra-high-speed internet, a VOD system employing a general subscriber telephone line and an internet protocol (IP) network is used. In the case of HDTV, test service is being carried out at a rate of 4 to 6 Mbps. Considering transmission capacity of HDTV broadcasting of 19.3 Mbps, limitations on communication networks disappear as VDSL of 26 Mbps is propagated.

Recently, digital multimedia broadcasting (DMB) in which broadcasting and communication are not distinctly discriminated from each other has come into the spotlight. The DMB becomes a medium capable of providing high-speed wide-band multimedia information services the most fast and cheaply.

H.264 coding method is largely classified into context adaptive variable length coding (CAVLC) and context-based adaptive binary arithmetic codes (CABAC). At present, H.264 Baseline and X profile use the CAVLC and main profile uses both the CAVLC and CABAC.

The CAVLC can obtain coefficients through four steps. The first step obtains trailing ones T1s and total coefficient to estimate the form of a 4×4 block, and the second step obtains a level value. The third step obtains the value of total zero, and the fourth step obtains Run_before to obtain substantial coefficients.

FIG. 1 represents a table with respect to Num-VLCO of conventional H.264. The first step of CAVLC requires a lot of calculations when the CAVLC is carried out. To obtain trailing ones T1s and the total coefficient in the first step, an input bit stream is compared to the table to find a position of the table corresponding to the input bit stream. There are total four tables for obtaining the trailing ones T1s and total coefficient in H.264, and the table shown in FIG. 1 is one of them.

When CAVLC is processed with software or general CAVLC hardware, parameters should be extracted through the following example.

It is assumed that a bit stream "00000000011100 . . . " is inputted to a decoder. If the table of FIG. 1 is selected from the tables for obtaining total coefficients in H.264 standard (a table is selected based on the number of total coefficients of neighboring macro blocks), the table of FIG. 1 has total 62 bit streams. The input bit stream is compared to the bit streams of the table of FIG. 1. When the input bit stream is compared to the bit streams of the table while shifting the input bit stream bit by bit in software processing, a lot of comparisons are required even in hardware processing. A further improved method is to count the number of '0's of the input bit stream and grasp the number of leading zeros (9 in the case of the aforementioned example), to thereby find a bit stream having the same number of leading zeros as the grasped number of leading zeros from the table of FIG. 1. There are plural bit streams found. Remaining bits of the found bit streams other than '0's are accorded to obtain trailing ones T1s and total coefficients at the positions of the accorded result values.

To grasp the number of '0's, '0's are continuously counted until a bit '1' appears while routinely shifting bits. Thus, it takes a long time to grasp the total number of '1's and a lot of calculations and time are required for searching the table for the '0's. As described above, when table search and pattern agreement are performed using a conventional method, a lot of calculations and time are required, and thus improvement in the performance of the H.264 decoder is needed.

SUMMARY OF THE INVENTION

Accordingly, the present invention has been made to solve the above problems occurring in the prior art, and it is an object of the present invention is to provide a method for searching a plurality of tables fast and effectively to obtain coefficients for CAVLC blocks within the shortest period of time such that a decoder with excellent efficiency can be designed for low frequency.

To accomplish the above object, according to the present invention, there is provided a H.264 decoding method for fast CAVLC including: a first step of obtaining the number of '0's including the firstly inputted bit '0' to the bit '0' right before the bit '1' firstly appearing to obtain a row index value; a second step of obtaining a fix index indicating the first bit '1'; a third step of obtaining a column index indicating a bit stream other than the row index and fix index; and a fourth step of obtaining a total coefficient and trailing ones T1s corresponding to the row index value and the column index value.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a table with respect to Num-VLCO of conventional H.264;

FIG. 3 is a fast search Num-VLCO table according to the present invention;

FIG. 5 is a table obtained by modifying the table of FIG. 1 in order to perform fast CAVLC according to the present invention;

FIG. 6 is a table with respect to Num-VLC1 of H.264 according to the present invention;

FIG. 7 is a table obtained by modifying the table of FIG. 6 in order to perform fast CAVLC according to the present invention;

FIG. 8 is a table of Num-VLC2 of H.264 according to the present invention;

FIG. 9 is a table obtained by modifying the table of FIG. 8 in order to perform fast CAVLC according to the present invention;

FIG. 10 8 is a table of ChromaDC Num-VCL of H.264 according to the present invention;

DETAILED DESCRIPTION OF THE PREFERRED EMBODIMENT

It will now described in detail to the preferred embodiment of the present invention with reference to the attached drawings.

Figure 2:
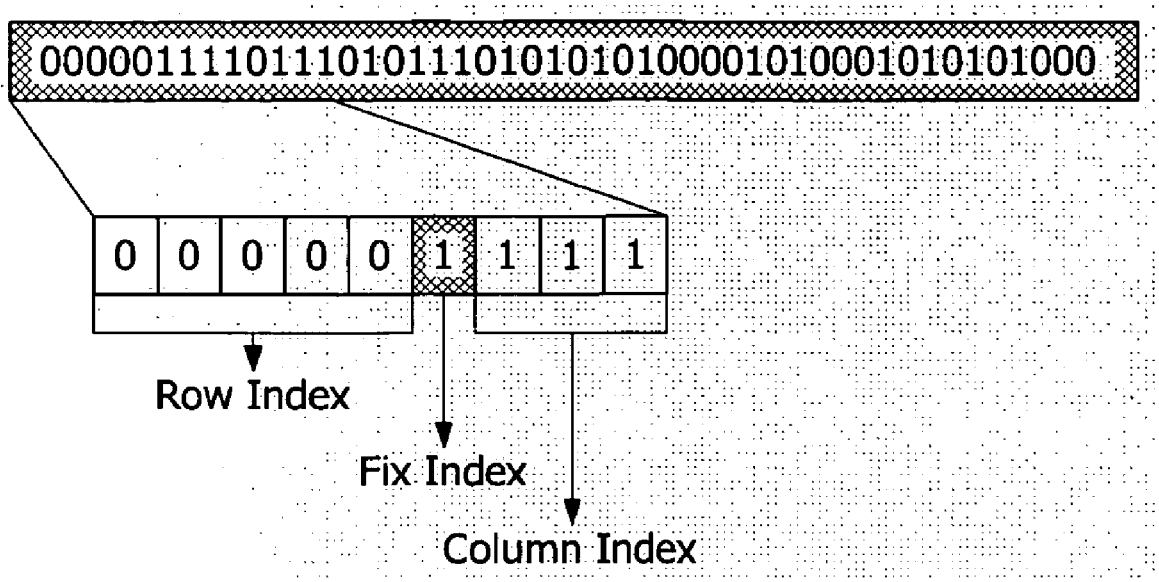
FIG. 2 illustrates a fast CAVLC stream structure according to the present invention.

FIG. 2 illustrates a fast CAVLC stream structure according to the present invention. FIG. 2 is obtained by analyzing an input bit stream of H.264 CAVLC. The present invention modifies the table for obtaining the total coefficients and trailing ones T1s, shown in FIG. 1, to a table as shown in FIG. 5 using the input bit stream of H.264 CAVLC shown in FIG. 2. An input bit stream form and fast table for performing fast CAVLC will now be explained.

FIG. 3 illustrates a fast search Num-VLCO table according to the present invention. An input bit stream includes a row index, a fix index and a column index. The row index indicates a bit stream including the firstly inputted bit '0' to the bit '0' right before a bit '1' firstly appearing. The value of the row index is defined as the number of '0's appearing before the first '1'. Referring to FIG. 1, the first fix index includes at least one '1' in bit streams including '0'. Except these bit streams, the remaining bit stream of the table of FIG. 1 consists of one bit. That is, all the H.264 CAVLC input bit streams include at least one '1'.

The column index indicates a bit stream other than the row index and the fix index. The table of FIG. 1 can be modified to the tables of FIGS. 3 and 5 according to the aforementioned construction.

In the table of FIG. 3, all the bit streams that can be obtained except the row index are arranged in response to the number of leading zeros (the number of '0's including the first bit '0' to bit '0' right before the first '1') based on the table of FIG. 1. Assuming that the value of the leading zero from the row index is 11, bit streams of the fix index and column index other than the row index include total 8 bit streams ('1000', '1001', '1010', '1011', '1100', '1101', '1110' and '1111'). This can be known by tracking the value when the value of leading zero is 11. FIG. 3 represents the total 8 bit streams according to the leading zero.

More specifically, the first bit of each of the 8 bit streams is the fix index that always has '1' and the remaining bits sequentially have values '0' to '7'. These sequential values correspond to the column index of FIG. 4. Consequently, the row index value becomes the value of leading zero, and the column index value corresponds to the value other than the leading zero and fix index in FIG. 5. Referring to the table of positions of the row index and column index, shown in FIG. 5, there are total coefficients and trailing ones T1s and CAVLC is performed using them.

The total coefficient and trailing ones T1s are obtained for an input bit stream '<u>0000011101</u> . . . ', for example. First, the number of leading zeros is obtained. In this case, the number of leading zeros is 5. When the number of leading zeros is 5, there are 3 following bits in the bit stream. In this example, the 3 bits are '111'. When the fix index '1' is deleted from the bit stream '111', '11' is obtained. Consequently, the row index value becomes '5' corresponding to the number of leading zeros and the column index values becomes '3' in FIG. 4, and thus the total coefficient becomes '2' and trailing ones T1s becomes '0' in FIG. 5.

Figure 4:
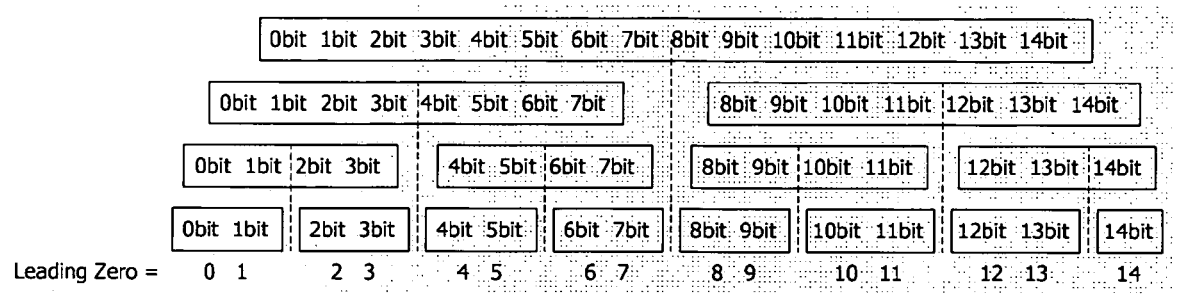
FIG. 4 illustrates an example of obtaining leading zeros according to the present invention.

FIG. 4 illustrates an example of obtaining leading zeros according to the present invention. When H.264 decoding is performed, a CAVLC processing block requires a processing time longer than the processing time of other H.264 blocks (IDCT, INTRA prediction, etc.). To improve H.264 decoding performance, accordingly, it is more efficient to obtain the CAVLC result within a short period of time in terms of the H.264 decoder even if hardware complexity is slightly increased. To obtain leading zeros is to obtain the row index value of FIG. 3. A general method of obtaining leading zeros judges whether the first bit of an input bit stream is '0' or '1', shifts the bit stream, and judges whether the next bit is '0' or '1'. Referring to FIG. 1, the leading zero value has maximum 15 bits. Accordingly, leading zeros of the first to fifteenth bits of the input bit stream are obtain in the present invention. A method of selecting the bit stream having the maximum number of bits for various tables will now be explained.

Figures 11, 12:
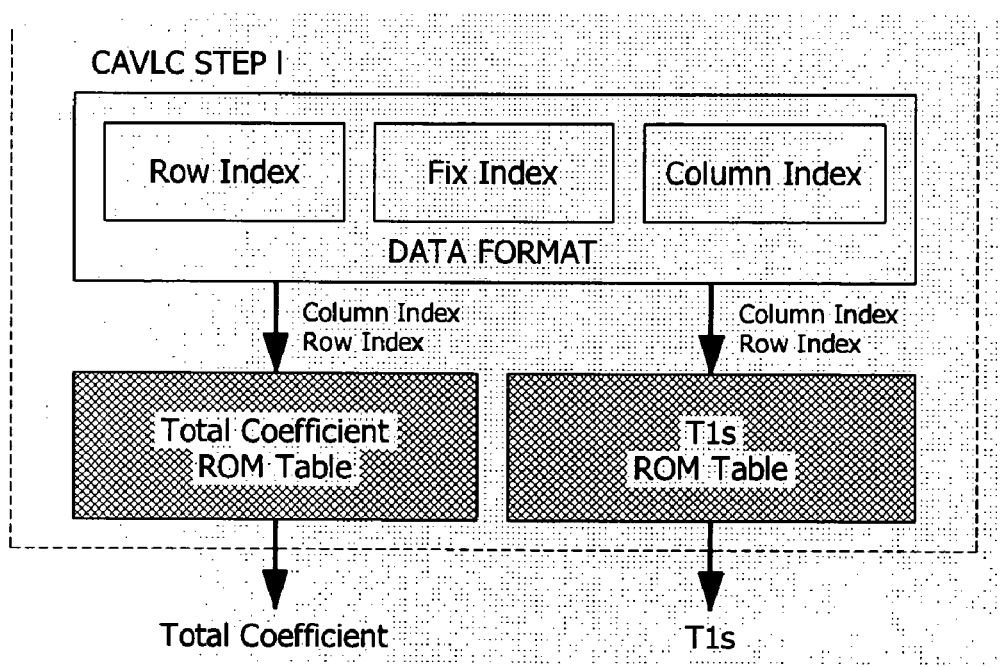
FIG. 11 is a table obtained by modifying the table of FIG. 10 in order to perform fast CAVLC according to the present invention.
FIG. 12 is a block diagram for obtaining total coefficients and trailing ones T1s according to the present invention.

FIG. 5 is a table obtained by modifying the table of FIG. 1 in order to perform fast CAVLC according to the present invention, and FIG. 6 is a table with respect to Num-VLC1 of H.264 according to the present invention. FIG. 7 is a table obtained by modifying the table of FIG. 6 in order to perform fast CAVLC according to the present invention, and FIG. 8 is a table of Num-VLC2 of H.264 according to the present invention. FIG. 9 is a table obtained by modifying the table of FIG. 8 in order to perform fast CAVLC according to the present invention, and FIG. 10 8 is a table of ChromaDC Num-VCL of H.264 according to the present invention. FIG. 11 is a table obtained by modifying the table of FIG. 10 in order to perform fast CAVLC according to the present invention.

The final value of the row index in FIGS. 5, 7, 9 and 11 indicates the maximum number of leading zeros the corresponding table can have. The maximum number of leading zeros is 14 in FIG. 5, 12 in FIG. 7, 9 in FIG. 9, and 7 in FIG. 11. Which one of the tables of FIGS. 5, 7, 9 11 is selected is decided by the number of macro blocks for which CAVLC is currently performed and the number of macro blocks on the left of the macro blocks. Consequently, the maximum number of bits of the input bit stream is 15 in the case of FIG. 5, 13 in the case of FIG. 7, 10 in the case of FIG. 9, and 8 in the case of FIG. 11. With the maximum number of bits, the leading zero is obtained as follows.

Referring to FIG. 5, for example, 15 bits (0th bit to the fourteenth bit) is divided into two bit streams. The first bit stream includes the 0th bit to the seventh bit and the second bit stream includes the eighth bit to the fourteenth bit. Then, the sum of the 0th bit to the seventh bit is obtained or it is judged whether each of the 0th bit to the seventh bit is larger than '0'. Furthermore, the sum of the eighth bit to the fourteenth bit is obtained or it is judged whether each of the 0th bit to the seventh bit is larger than '0'. If the sum of the 0th bit to the seventh bit is larger than '0' or it is judged that there is a bit larger than '0', the first bit stream includes '1', and thus the leading zero is obtained from the first bit stream. That is, the eighth to fourteenth bits are ignored. If the sum of the 0th bit to the seventh bit is identical to '0' or it is judged that the 0th bit to the seventh bit correspond to '0', the leading zero is obtained from the second bit stream. When one bit stream is decided as described above, the process is divided into two identical steps and these steps are sequentially carried out to obtain the leading zero as shown in FIG. 4.

FIG. 12 is a block diagram for obtaining total coefficients and trailing ones T1s according to the present invention. The currently inputted bit stream is divided into a leading zero block, a fix index block and a column index block. The tables of FIGS. 5, 7, 9 and 11 are respectively allocated to ROM tables, which are internal memories, and stored therein. The row index and column index are obtained using the result value of the bit stream and placed in the ROM tables, to obtain the total coefficients and trailing ones T1s.

As described above, the H.264 decoding method for fast CAVLC according to the present invention can minimize the time required for calculating each block and hardware complexity to attain maximum performance at low frequencies. Furthermore, the present invention modifies the existing tables and divides an input bit stream into significant bit streams to maximize the performance of the H.264 decoder, thereby minimizing CAVLC calculating time.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A H.264 decoding method for fast context adaptive variable length coding (CAVLC), the method comprising:
   receiving a CAVLC encoded bit stream;
   determining the number of leading zeros in the encoded bit stream, a row index of a look-up table being derived from the number of leading zeros, the look-up table including an array of total coefficient value-trailing ones value pairs and stored in a memory;
   determining a column index value of the look-up table from the encoded bit stream;
   reading a total coefficient value and a trailing ones (T1s) value corresponding to the row index value and the column index value from the look-up table stored in the memory;
   generating coefficients for video decoding based on the total coefficient value and the trailing ones value; and
   generating video data based on the coefficients.

2. The H.264 decoding method according to claim 1, wherein the encoded bit stream is divided into two sub-blocks and the number of leading zeros is determined by repeatedly sub-dividing a sub-block that is determined to include a first non-zero bit.

3. The H.264 decoding method according to claim 2, the encoded bit stream comprises any one of fifteen bit, thirteen bits, ten bits, and eight bits.

4. The H.264 decoding method according to claim 3, wherein the number of leading zeros is determined based on each sum of two sub-blocks.

5. The H.264 decoding method according to claim 3, wherein the number of leading zeros is obtained by comparing each of the two sub-blocks to '0'.

6. An H.264 decoder for fast context adaptive variable length coding (CAVLC), the decoder comprising:
   a receiver configured to receive a CAVLC encoded bit stream;
   a memory configured to store a look-up table including an array of total coefficient value-trailing ones value pairs; and
   a controller configured to determine the number of leading zeros in the encoded bit stream, a row index of the look-up table being derived from the number of leading zeros, determine a column index value of the look-up table from the encoded bit stream, obtain a total coefficient value and a trailing ones (T1s) value corresponding to the row index value and the column index value from the look-up table stored in the memory, generate coefficients for video decoding based on the total coefficient value and the trailing ones value, and generate video data based on the coefficients.

7. The decoder of claim 6 wherein the controller is configured to divide the encoded bit stream into two sub-blocks and determine the number of leading zeros by repeatedly sub-dividing a sub-block that is determined to include a first non-zero bit.

8. The decoder of claim 7 wherein the receiver is configured to receive the encoded bit stream that comprises any one of fifteen bits, thirteen bits, ten bits, and eight bits.

9. The decoder of claim 8 wherein the controller is configured to determine the number of leading zeros based on each sum of two sub-blocks.

10. The decoder of claim 8 wherein the controller is configured to obtain the number of leading zeros by comparing each of the two sub-blocks to zero.

* * * * *